United States Patent [19]

Hung et al.

[11] Patent Number: 4,709,296

[45] Date of Patent: Nov. 24, 1987

[54] PROTECTION ARRANGEMENT FOR A TELEPHONE SUBSCRIBER LINE INTERFACE CIRCUIT

[75] Inventors: Francis Y. Hung, Kanata; Frederick C. Livermore, Stittsville, both of Canada

[73] Assignee: Northern Telecom Limited, Montreal, Canada

[21] Appl. No.: 747,581

[22] Filed: Jun. 20, 1985

[51] Int. Cl.$^4$ .................... H04M 3/18; H02H 3/093
[52] U.S. Cl. ...................... 361/102; 361/91; 361/93; 361/119; 361/7; 361/5; 361/6; 379/412; 379/413
[58] Field of Search .................... 323/235, 237; 361/2, 361/3, 5, 6, 7, 71, 75, 86, 93, 94, 102; 379/2, 412, 413, 405

[56] References Cited

U.S. PATENT DOCUMENTS

| 3,671,807 | 6/1972 | Milligan ............................ 361/7 |
| 3,808,455 | 4/1974 | Leisi ................................. 361/3 |
| 4,197,435 | 4/1980 | Jackson ........................... 379/2 X |
| 4,431,868 | 2/1984 | Bolus et al. ...................... 379/373 |
| 4,431,869 | 2/1984 | Sweet .............................. 379/378 |
| 4,467,310 | 8/1984 | Jakab ............................... 338/22 R |

FOREIGN PATENT DOCUMENTS 1179078  6/1982  Canada .................................. 379/16

Primary Examiner—A. D. Pellinen
Assistant Examiner—H. L. Williams
Attorney, Agent, or Firm—R. John Haley

[57] ABSTRACT

The contacts of an isolation relay are positioned between a line interface circuit and the associated feed resistors, the relay being controlled to open the contacts in response to an excessive common mode alternating current through the feed resistors. The common mode a.c. is detected by a sensing amplifier, and is integrated and compared with a threshold level in a dectector unit. If the common mode a.c. is excessive, a zero crossing predictor enables the detector unit to control the isolation relay and open its contacts at a zero crossing of the a.c. A phase shifter in the zero crossing predictor compensates for the response delay of the isolation relay. As the excessive current is now interrupted, the sensing amplifier responds to the line voltage. When this falls below a predetermined peak level, a delayed resetting of the protection arrangement is automatically effected.

18 Claims, 4 Drawing Figures

PROTECTION ARRANGEMENT FOR A TELEPHONE SUBSCRIBER LINE INTERFACE CIRCUIT

This invention relates to an overcurrent protection arrangement for a telephone subscriber line interface circuit, referred to below as a SLIC.

It is a well known requirement to protect a SLIC, which typically contains sensitive electronic components, from high voltages which may occur on the line to which the SLIC is connected, for example due to power line crosses and excessive induced alternating currents. It is desirable for the protection arrangement to provide full protection to the SLIC under all common fault conditions, to accommodate various normal operating conditions in which, for example, significant but not excessive currents are induced on the line, and to reset itself automatically when a fault condition is removed. In addition, because a protection arrangement is needed for each line, important commercial requirements are that it be of low cost and of small size.

Many forms of protection arrangement have been proposed. For example, it has long been known to use so-called heating coil protectors, in which resistive heating coils are connected in series with fusible links in the subscriber line wires, the heating effect, in the event of an excessive current, melting the fusible link to open the subscriber line connection. Such protectors have disadvantages in that they add to the resistance in series with the subscriber line and they can not reset themselves after a fault but instead must be manually replaced. In addition, they are relatively slow to respond to a fault, and during their response time battery feed resistors, which are also connected in series with the subscriber line wires, are exposed to the excessive current and must dissipate a substantial amount of power. Precautions must then be taken to avoid excessive heating of the feed resistors.

In order to overcome some of the above disadvantages, Jakab U.S. Pat. No. 4,467,310, issued Aug. 21, 1984 and entitled "Telephone Subscriber Line Battery Feed Resistor Arrangements", describes an arrangement in which a switching type PTC thermistor is connected in series with and forms part of a battery feed resistor with which it is in close thermal contact. Whilst such an arrangement is effective, it has a relatively high cost because it requires the use of closely matched thermistors in order to provide the necessary very close matching of resistances in the subscriber line wires.

Other known protection arrangements, involving for example the use of fusible solder bridges, or triggerable thyristors, involve other combinations of disadvantages such as those outlined above, or other disadvantages such as the need for additional components, involving extra cost, or being subject to undesired triggering for example due to spurious and transient subscriber line voltages and currents.

Accordingly, it is an object of this invention to provide an improved protection arrangement for a SLIC.

According to this invention there is provided apparatus comprising a telephone subscriber arrangement for a line interface circuit which is coupled to a two feed resistors for coupling the line interface circuit to a two-wire telephone subscriber line, and a protection arrangement comprising: switching means between the feed resistors and the line interface circuit, the switching means being closed in normal operation to connect the feed resistors to the line interface circuit; and control means responsive to common mode current through the feed resistors for opening the switching means to interrupt connections between the feed resistors and the line interface circuit.

Thus in accordance with the invention connections between the feed resistors and the line interface circuit are interrupted in the event of an excessive common mode current through the feed resistors, such as occurs in the event of a power line cross or an excessive induced current. Because the switching means can open rapidly under the control of the control means, and such opening interrupts the excessive current, power dissipation in the feed resistors is reduced.

The switching means conveniently comprises a relay, in particular an isolation relay for the line which isolation relay is normally connected on the line side of the feed resistors. The repositioning of the conventional isolation relay to consititute the switching means of this invention is particularly convenient in that the switching means is thereby provided without extra cost.

In an embodiment of the invention the control means comprises sensing means for producing an output voltage dependent upon the common mode current through the feed resistors; and detecting means responsive to the output voltage of the sensing means for controlling the switching means.

In a preferred form, the sensing means comprises a differential amplifier having an inverting input, a non-inverting input, and an output at which the output voltage of the sensing means is produced; a feedback resistor connected between the output and the inverting input of the differential amplifier; and a first resistive potential divider connected between the feed resistors on the two-wire line sides thereof, and a second resistive potential divider connected between the feed resistors on the line interface circuit sides thereof, each potential divider having a tapping point connected to a respective input of the differential amplifier, and further comprises a resistor connected between the non-inverting input of the differential amplifier and a point of reference potential; and clamping diodes each connected between a respective input of the differential amplifier and a respective supply voltage for the differential amplifier for limiting voltages applied to the respective input. Conveniently the tapping point of the first potential divider is connected to the inverting input of the differential amplifier.

This form of the sensing means not only provides for sensing of common mode current through the feed resistors, without being responsive to differential current, but also is responsive to voltages on the line with respect to ground. The latter feature is particularly desirable in that the interruption of an excessive common mode current by opening of the switching means results in the common mode current dropping to a low level. Detection of the line voltage with respect to ground then enables the sensing means to determine whether or not the fault which caused the excessive current still persists. However, significant voltages which may occur on the line in normal operation should not act to maintain the open state of the switching means. The above arrangement of the sensing means enables these requirements to be met in a convenient manner.

The detecting means preferably comprises rectifying and integrating means for rectifying and integrating the output voltage of the sensing means to produce an integrated voltage dependent upon the common mode current through the feed resistors; and comparison means responsive to the integrated voltage exceeding a reference level for opening the switching means. The integration enables the detecting means to respond rapidly to a high common mode current whilst not responding to transient and spurious currents which may occur. False opening of the switching means is thereby substantially eliminated.

The detecting means preferably also includes means responsive to the comparison means for providing a high impedance discharge path for the integrating means when the switching means is open. The high impedance discharge path avoids chattering of the switching means by providing a delayed resetting of the protection arrangement, and hence closing of the switching means to its normal closed state, after a fault has been removed. The resetting of the protection arrangement is automatic, in contrast to the manual operations which are necessary for example for heating coil protectors. The protection arrangement of the invention avoids the need for such additional protection devices.

In order to reduce or eliminate arcing when the switching means is opened in the event of a fault, the protection arrangement preferably comprises zero crossing detection means for providing a reference level for the comparison means in dependence upon zero crossing times of an alternating output voltage of the sensing means, whereby opening of the switching means in response to a common mode alternating current through the feed resistors is effected substantially at a zero crossing time of the alternating current. Advantageously the zero crossing detection means includes phase shifting means for providing the reference level for the comparison means a predetermined time in advance of a zero crossing of the alternating output voltage of the sensing means, the predetermined time corresponding to a response delay time of the switching means, and latching means for maintaining the reference level for the comparison means when the switching means is open.

In a particular embodiment of the invention described below, the zero crossing detection means comprises a differential amplifier having differential inputs, one of which is connected to a zero voltage reference point, and an output; a phase shifter, comprising a series capacitor and a shunt resistor, connected between the output of the sensing amplifier and the other input of the differential amplifier; a transistor having a control electrode capacitively coupled to the output of the differential amplifier and a controlled path for supplying the reference level for the comparison means; and latching means coupled between an output of the comparison means and the control electrode of the transistor for controlling the transistor to maintain the reference level when the switching means is open.

Considered in an alternative manner, the protection arrangement preferably includes zero crossing detection means for enabling the detecting means to control the switching means to open the switching means in response to a common mode alternating current through the feed resistors only substantially at a zero crossing time of the alternating current. The zero crossing detection means preferably comprises phase shifting means responsive to an alternating output voltage of the sensing means for enabling the detecting means a predetermined time in advance of a zero crossing of the sensing means, the predetermined time corresponding to a response delay time of the switching means.

The invention will be further understood from the following description with reference to the accompanying drawings, in which.

Figure 1:
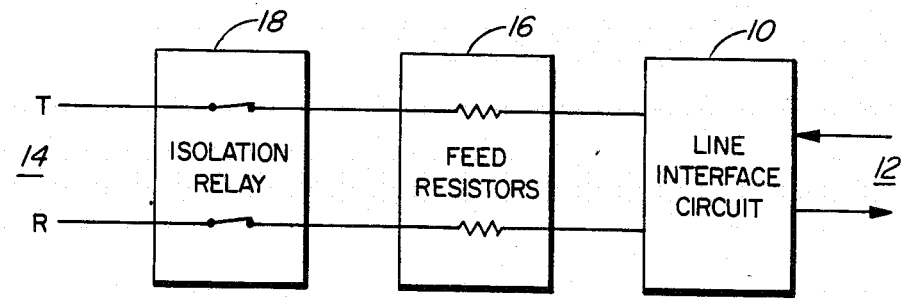
FIG. 1 is a block diagram of a known SLIC arrangement.

Referring to FIG. 1, a known SLIC arrangement comprises a subscriber line interface circuit 10 which serves to couple a 4-wire path 12 to a 2-wire subscriber line 14 comprising tip and ring wires T and R respectively, via a pair of closely matched battery feed resistors 16 and contacts of an isolation relay 18. The line interface circuit 10 also includes circuitry for call supervision, to which end it generally includes connections to the subscriber line sides of the feed resistors 16; these are not shown in the drawings for the sake of clarity. The feed resistors 16 may themselves be considered a part of the line interface circuit 10, but here they are described separately in order to assist in describing the invention.

The line interface circuit 10 can have any of a large number of forms. For example, it can have the form of an active impedance circuit as described in Northern Telecom Limited Canadian Patent No. 1,179,079 issued Dec. 4, 1984 and entitled "Active Impedance Line Feed Circuit". The feed resistors 16 are typically thick film resistors on a common substrate, each having a resistance of for example 100 ohms, closely matched to one another to a precise tolerance, and constructed and mounted to dissipate a substantial amount of power as may be necessary in the event of a line fault as described in the introduction. The isolation relay 18, which is not normally shown in SLIC diagrams, is always present in order to provide for selective connection and disconnection between the SLIC and the subscriber line 14, for cut-over of the telephone switching system and for line isolation and testing purposes. In addition to the blocks shown, such a known SLIC arrangement must include an overcurrent protection arrangement, for example of the heating coil type described in the introduction, for protection of the SLIC components from excessive currents which may occur on the line 14.

Figure 2:
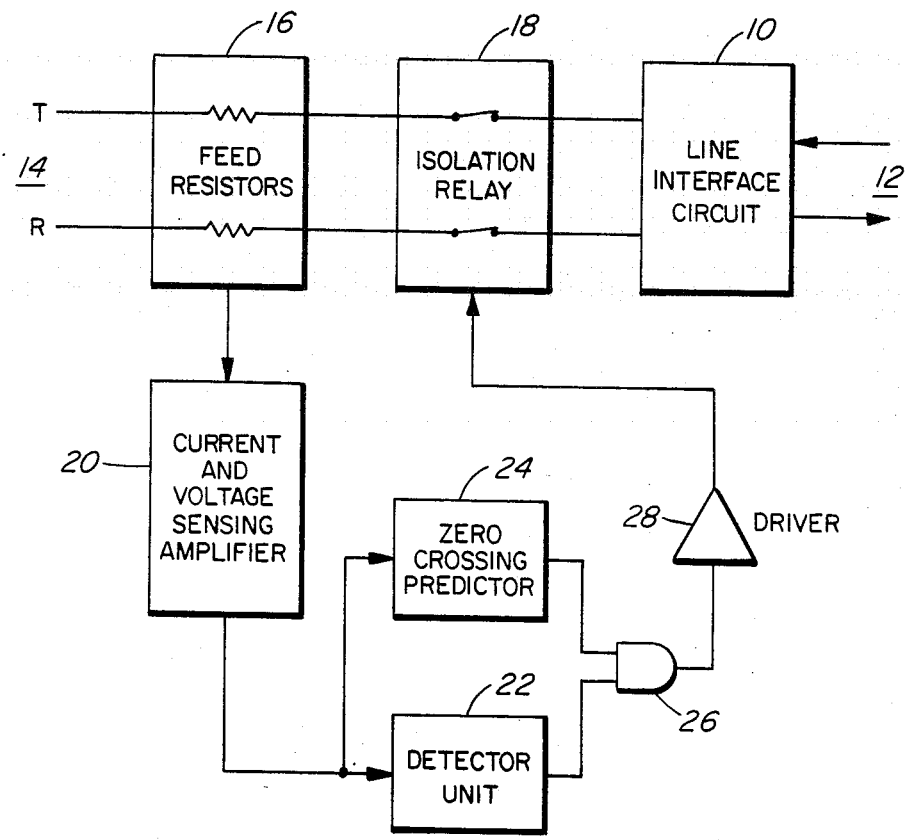
FIG. 2 is a general functional block diagram of a SLIC arrangement incorporating an overcurrent protection arrangement in accordance with an embodiment of this invention.

Referring now to FIG. 2, a SLIC and associated overcurrent protection arrangement are shown. The same reference numerals as in FIG. 1 are used to denote the same elements, namely the line interface circuit 10, 4-wire line 12, 2-wire line 14 with tip and ring wires T and R, feed resistors 16, and isolation relay 18. In the arrangement of FIG. 2, however, the isolation relay contacts are coupled between the feed resistors 16 and the line interface circuit 10, instead of being between the feed resistors 16 and the line 14 as in the prior art of FIG. 1.

This repositioning of the isolation relay contacts is preferred because it enables the isolation relay 18 to serve not only for its normal purposes but also for protection purposes when it is also controlled in the manner described in detail below. However, the principles of the invention are also applicable in the same manner to the control of an additional relay which may be provided with contacts in the position of the isolation relay contacts in FIG. 1, the isolation relay in that case remaining in its normal position with its contacts between the feed resistors 16 and the line 14.

In addition to the elements described above, FIG. 2 illustrates in a general functional block diagrammatic form elements of an overcurrent protection arrangement which comprises a current and voltage sensing amplifier 20, a detector unit 22, a zero crossing predictor 24, an AND gate 26, and a relay driver 28. These elements and their functions are described in detail below, and a specific form in which they may be implemented is described with reference to FIG. 3.

The current and voltage sensing amplifier 20 is coupled to the feed resistors 16, and produces at its output a voltage which is dependent upon the common mode current passing through the feed resistors 16 and the voltage of the tip and ring wires T and R of the subscriber line 14 with respect to ground. The amplifier 20 is not responsive to differential currents flowing through the feed resistors, so that for example it does not respond to ringing signal currents applied to the ring wire side of the line 14. The amplifier 20 includes its own diode clamping bridge for protecting it from excessive voltages on the line 14, so that it is not destroyed thereby.

In the event that an excessive common mode alternating current is present on the line 14, the output of the amplifier 20 causes the detector unit 22 to provide an output signal for driving the isolation relay 18, via the driver 28, to open its contacts and hence isolate the line interface circuit from the line 14. As the isolation relay has a finite response time, typically about 2 ms (milliseconds), for opening its contacts, this signal is gated with the output of the zero crossing predictor 24 in the gate 26 so that it occurs 2 ms before a zero crossing of the excessive alternating current (normally a.c. mains frequency, e.g. 60 Hz). In consequence, the contacts of the isolation relay 18 are opened substantially at the instant of such a zero crossing, so that arcing at the relay contacts is reduced or eliminated.

The detector unit 22 incorporates integrating circuitry, and an associated threshold detector constituted by a Schmitt trigger circuit, which is responsive to the output of the amplifier 20 so that the isolation relay contacts are not opened in response to spurious and transient voltages which may occur in normal operation on the line 14. In addition, the detector unit 22 incorporates a delayed resetting arrangement which enables the isolation relay contacts to be closed automatically after a fault has been cleared. The delayed resetting avoids chattering of the isolation relay which might otherwise occur in the event that relatively low voltages with respect to ground, for example up to 50 volts rms, persist on the line 14.

Figure 3:
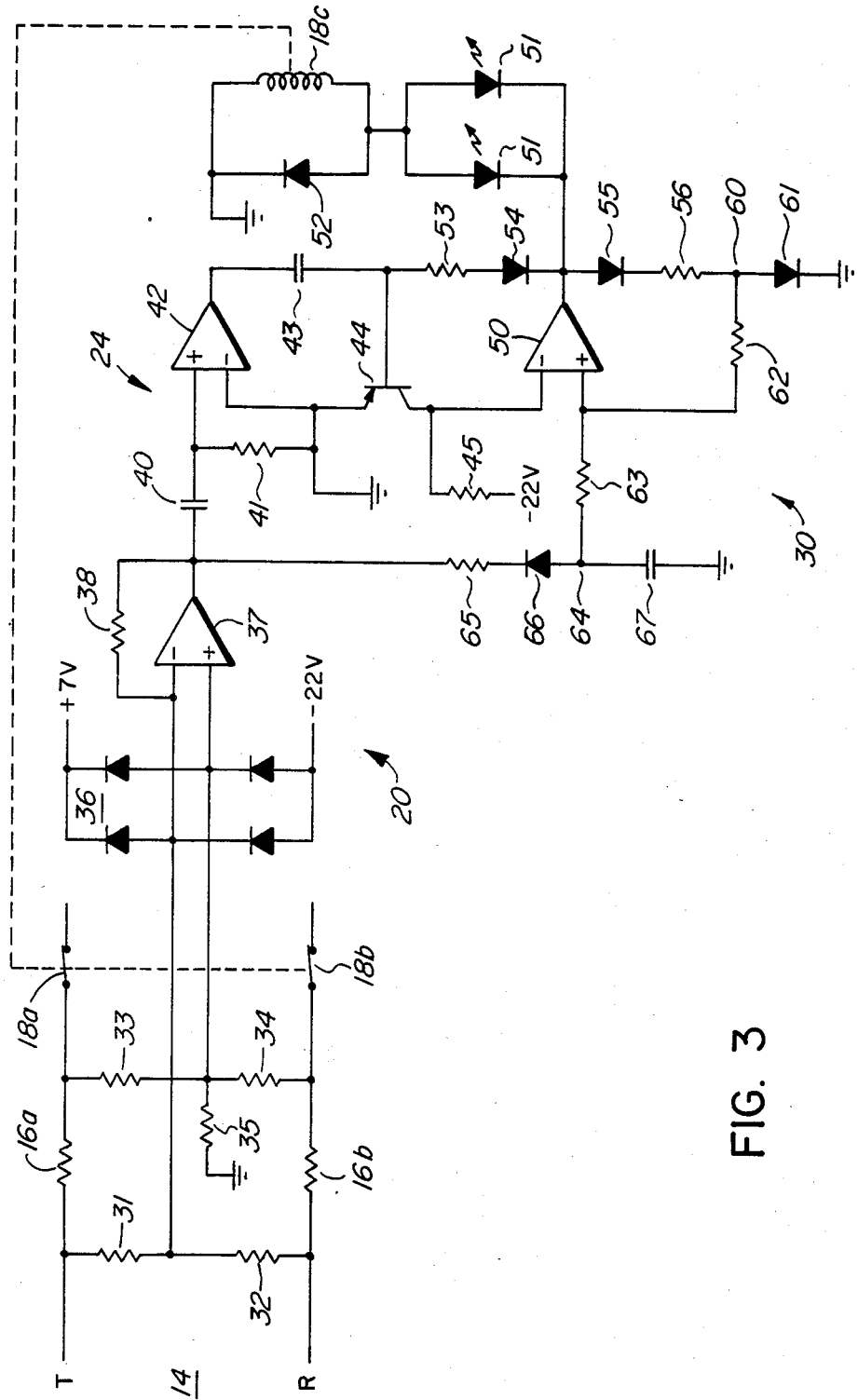
FIG. 3 is a circuit diagram schematically illustrating an overcurrent protection arrangement in accordance with an embodiment of this invention.

Referring now to FIG. 3, a detailed circuit diagram of the protection arrangement is illustrated. FIG. 3 also shows the feed resistors 16, referenced 16a and 16b, the tip and ring wires T and R of the line 14, and the isolation relay 18, its contacts being referenced 18a and 18b and its winding or coil being referenced 18c. The elements 20 and 24 of FIG. 2 are generally indicated in FIG. 3, and the functions of the elements 22, 26, and 28 of FIG. 2 are combined in the remaining circuitry of FIG. 3 which is indicated by a reference 30.

The current and voltage sensing amplifier 20 consists of a resistance network comprising resistors 31 to 35, a diode bridge circuit 36, and a differential amplifier 37 with a negative feedback resistor 38. The resistors 31 and 32 form a potential divider across the line 14 on one side of the feed resistors 16, and the resistors 33 and 34 form a similar potential divider on the other side of the feed resistors 16, the tapping points of the potential dividers being connected respectively to the inverting and non-inverting inputs of the amplifier 37. These inputs are clamped between voltages of +7 and −22 volts, these being supply voltages for the entire protection circuit, by the diode bridge circuit 36. The resistor 35 is connected between the tapping point of the second potential divider, i.e. the junction between the resistors 33 and 34 and the non-inverting input of the amplifier 37, and ground potential of 0 volts. The output of the differential amplifier 37 constitutes the output of the amplifier 20.

The zero crossing predictor 24 comprises a phase shifter, constituted by a series capacitor 40 and a shunt resistor 41, a comparator 42 constituted by a differential amplifier having its inverting input grounded, a capacitor 43, and a latching transistor 44 with a collector load resistor 45. The phase shifter couples the output of the differential amplifier 37 to the non-inverting input of the comparator 42, whose output is coupled via the capacitor 43 to the base of the latching transistor 44. The transistor 44 is a PNP transistor having its emitter grounded and its collector connected via the resistor 45 to the −22 volt supply. Other connections to the base and collector of this transistor are described below.

The remaining circuitry 30 includes a differential amplifier 50 whose inverting input is connected to the collector of the transistor 44, and whose output drives the isolation relay coil 18c via two parallel (for handling the required current) light-emitting diodes 51. The diodes 51 conduct when the output of the amplifier 50 is negative, whereby the isolation relay is activated, and at the same time provide a visible indication of this. A normally reverse biased diode 52 is connected in parallel with the relay coil 18c in known manner.

The amplifier 50 participates in two control loops, the operation of which is described in detail below. One of these includes a series-connected resistor 53 and diode 54 connected between the base of the transistor 44 and the output of the amplifier 50. The other comprises a series-connected diode 55 and resistor 56 connected between the output of the amplifier 50 and a junction point 60, from which a diode 61 is connected to ground and a resistor 62 is connected to the non-inverting input of the amplifier 50. The diodes 54, 55 and 61 are poled so that when the output of the amplifier 50 is positive, the diode 54 is reverse biased and the diodes 55 and 61 are forward biased, whereby the junction point 60 has a reference potential of +0.6 volt.

The non-inverting input of the amplifier 50 is also connected via a resistor 63 to a junction point 64 which constitutes the output of a rectifying integrator constituted by a resistor 65, a diode 66, and a capacitor 67. The resistor 65 and diode 66 are connected in series between the output of the amplifier 37 and the junction point 64.

Before describing the manner in which the circuit shown in FIG. 3 operates, the following component values are given by way of example for the various resistors and capacitors in this circuit:

| | | | |
|---|---|---|---|
| 16a, 16b | 100 ohms | 45 | 20 kilohms |
| 31 to 34 | 300 kilohms | 56 | 10 kilohms |
| 35, 38 | 15 kilohms | 62 | 170 kilohms |
| 40 | 0.1 microfarad | 63 | 75 kilohms |
| 41 | 12 kilohms | 65 | 100 kilohms |
| 43 | 100 picofarads | 67 | 1 microfarad |

From the above values for the resistors 31 to 34 and 38, it should be appreciated that the differential amplifier 37 has a voltage gain of 15/300 with respect to one wire, or 15/150 with respect to both wires, of the subscriber line.

In normal operation, the output of the amplifier 37 and hence the junction point 64 are at substantially ground potential, so that the amplifier 50 produces an output of +7 volts whereby the diodes 55 and 61 are forward biased with the junction point 60 at +0.6 volts. The diodes 54 and 51 are reverse biased and the relay coil 18c is not energized.

Figure 4:
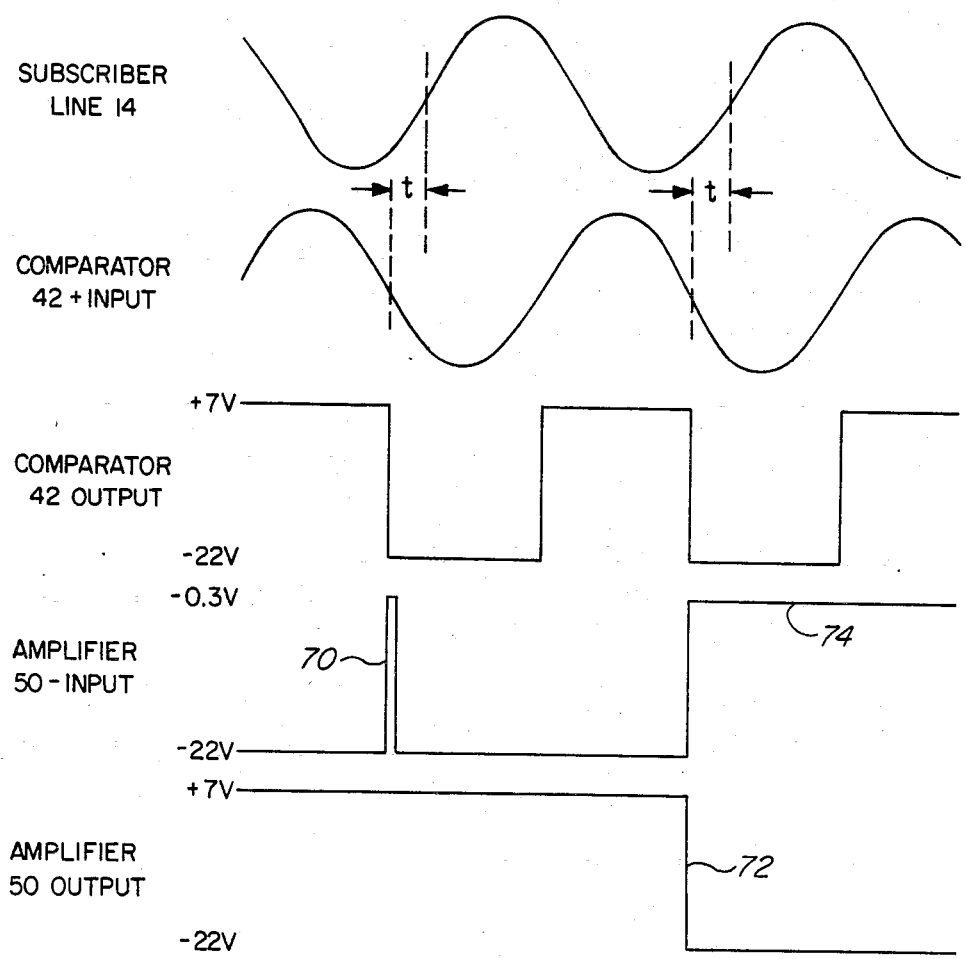
FIG. 4 is a diagram illustrating waveforms which may occur in operation of the circuit arrangement of FIG. 3.

A common mode alternating current which occurs on the line 14, for example at 60 Hz due to induction from or contact with power lines, results in a voltage drop across each of the feed resistors 16 and hence an alternating signal at the same frequency at the output of the differential amplifier 37. Such an induced a.c. signal is shown as the top waveform in FIG. 4. This signal, which as shown in the waveform diagrams of FIG. 4 is inverted by the amplifier 37, is shifted in phase by the phase shifter comprising the capacitor 40 and the resistor 41 to produce at the non-inverting input of the comparator 42 a signal as shown in the second waveform of FIG. 4. As shown in FIG. 4, zero crossings of the latter waveform are advanced by a time t in relation to zero crossings of the former waveform. The time t is selected to be equal to the contact opening response time of the isolation relay 18, in this case about 2 ms as already described above.

As shown in the third waveform in FIG. 4, the comparator 42 produces a square wave output signal alternating between the supply voltage levels of +7 and −22 volts. This is differentiated by the capacitor 43 to trigger the transistor 44 into conduction for a short period starting with each falling edge of the square wave. This causes the voltage at the collector of the transistor 44, and hence at the inverting input of the amplifier 50, to rise from its normal level of −22 volts to close to 0 volts, for example to −0.3 volt as shown in FIG. 4. In the absence of a latching situation as described below, the transistor 44 therefore produces at its collector a short-duration pulse 70 once in each cycle of the a.c. signal. Each pulse 70 constitutes an enabling pulse for the detector unit 22, thereby providing the function of the AND gate 26 in FIG. 2.

The a.c. signal at the output of the amplifier 37 is also rectified and integrated by the elements 65 to 67 to produce at the junction point 64 a negative voltage which is dependent upon the magnitude of the common mode a.c. on the line 14. The resistors 62 and 63 constitute a potential divider between the junction points 60 and 64, the former being at the fixed reference level of 0.6 volt, with the tapping point of the potential divider connected to the non-inverting input of the amplifier 50. If the common mode a.c. on the line 14 is of sufficient magnitude for a sufficient length of time that the capacitor 67 charges to about −1 volt (adjustable by varying the resistance of the resistor 62), so that the voltage at the non-inverting input of the amplifier 50 is more negative than that at the inverting input during one of the pulses 70, then the amplifier 50 changes its state, its output becoming negative. The negative-going transition, shown at 72 in the bottom waveform in FIG. 4, reverse biases the diodes 55 and 61 and forward biases the diode 54, so that the transistor 44 is latched in its conductive state so that its collector remains at −0.3 volts, as shown at 74 in FIG. 4. As the output of the amplifier 50 is now negative, the diodes 51 conduct to provide a visible indication that the protection circuit has been triggered, and the relay coil 18c is energized. After the 2 ms response delay, and hence at the zero crossing time of the excessive current on the line 14, the relay contacts 18a and 18b open thereby isolating the line interface circuit 10 from the line 14.

From the above description it should be appreciated that the integration provided by the capacitor 67 and the resistor 65 enable the protection circuit to respond very rapidly (within 1 a.c. cycle) to high line currents, more slowly (within several a.c. cycles) but still effectively to lower line currents which are still excessive, and not at all to spurious and transient currents, in a generally desirable manner. The precise current-time characteristics can be adjusted by varying the characteristics of the integrator 65, 67 and the potential divider 62, 63, and the desired relay response delay can be accommodated by adjusting the characteristics of the phase shifter 40, 41.

As a result of the above-described overcurrent protection switching, the contacts 18a and 18b are opened so that the line current falls to a very low value. By virtue of the provision of the resistor 35, the amplifier 37 now serves to respond to the voltage on the subscriber line 14 with respect to ground.

The ratio of the resistance of the resistor 35 to that of the (effectively paralleled for a power line cross) resistors 33 and 34, and the similar ratio between the resistances of the resistor 38 and the effectively paralleled resistors 31 and 32, is in this embodiment 1:10. As a result of the +7 volt clamping level provided by the diode bridge 36, in combination with this ratio and the negative feedback of the amplifier 37, the amplifier 37 has a negative output voltage for line 14 voltages greater than about 70 volts peak, thereby maintaining the negative charge on the capacitor 67 and hence maintaining the switched protection state. For peak voltages on the line 14 less than about 70 volts, the amplifier 37 has a zero voltage output. The latter situation applies when a fault, which has caused an excessive line current resulting in the above-described switching, is cured.

In the latter situation, the diodes 55, 61, and 66 are all reverse biased and hence present a very high resistance to discharge of the capacitor 67. The capacitor 67 therefore can only discharge via the non-inverting input of the amplifier 50, which itself has a high resistance thereby providing a long discharge time constant. However, after a substantial delay which is dependent upon the particular resistance values and the level to which the capacitor 67 was charged, the capacitor 67 will have discharged to a point where the non-inverting input of the amplifier 50 is less negative than the −0.3 volt level at the inverting input of this amplifier. In consequence, the amplifier 50, which is acting as a comparator, changes state so that its output returns to a level of +7 volts, restoring the normal operating state in which the relay coil 18c is not energized, the contacts 18a and 18b are closed, the diodes 55 and 61 are forward biased, and the diode 54 is reverse biased. Thus the desired automatic resetting of the protection circuit arrangement is achieved.

The protection arrangement described above provides several advantages which are not immediately apparent, in addition to the more apparent advantages of providing the desired overcurrent protection and automatic resetting without requiring conventional heating coil protectors. Most significantly, because of the rapid switching and opening of the relay contacts 18, the feed resistors 16 are no longer required to dissipate significant amounts of power. In consequence, they no longer need to be constructed and mounted in a manner to provide safe power dissipation. Instead, they can for example be incorporated as physically small resistances into a thin film resistor network including the resistors 31 to 35, providing an economy of components, space, and cost. Similar savings are provided in respect of a diode bridge, which is not shown in the drawings but which is conventionally connected to the wires extending between the feed resistors 16 and line amplifiers provided in the line interface circuit 10, in order to clamp the voltages on these wires to within the supply voltage range of the line amplifiers. Because of the reduced demands placed on the characteristics of the diode bridge, this can be incorporated into the output circuitry of the line amplifiers themselves.

In addition, it is observed that a drive transistor stage, which is conventionally required following the output of a decoder in order to provide the necessary current capacity for driving the isolation relay for isolation and testing purposes, can be dispensed with by coupling the output of the decoder to the input side of the amplifier 50.

Furthermore, it should be appreciated that, because the sensing amplifier 20 in the above-described protection arrangement is sensitive only to common mode line currents and not to differential line currents, the threshold current for the protection switching can be set to a much lower value, for example down to about 35 mA, than known protection arrangements.

Although a particular embodiment of the invention has been described in detail above, numerous modifications, variations, and adaptations may be made thereto without departing from the scope of the invention as defined in the claims. In particular, it is observed that the zero crossing predictor, whilst being desirable for avoiding arcing at the relay contacts, is not essential to the operation of the protection arrangement and accordingly may be omitted, the inverting input of the amplifier 50 in that case being connected to a fixed reference potential (e.g. ground or a small negative potential).

What is claimed is:

1. Apparatus comprising a telephone subscriber ine interface circuit, two feed resistors for coupling the line interface circuit to a two wire telephone subscriber line, and a protection arrangement comprising:
    switching means between the feed resistors and the line interface circuit, the switching means being closed in normal operation to connect the feed resistors to the line interface circuit; and
    control means responsive to common mode current through the feed resistors for opening the switching means to interrupt connections between the feed resistors and the line interface circuit.

2. Apparatus as claimed in claim 1 wherein the control means comprises:
    sensing means for producing an output voltage dependent upon the common mode current through the feed resistors; and
    detecting means responsive to the output voltage of the sensing means for controlling the switching means.

3. Apparatus as claimed in claim 2 wherein the sensing means comprises:
    a differential amplifier having an inverting input, a non-inverting input, and an output at which the output voltage of the sensing means is produced;
    a feedback resistor connected between the output and the inverting input of the differential amplifier; and
    a first resistive potential divider connected between the feed resistors on the two-wire line sides thereof, and a second resistive potential divider connected between the feed resistors on the line interface circuit sides thereof, each potential divider having a tapping point connected to a respective input of the differential amplifier.

4. Apparatus as claimed in claim 3 wherein the tapping point of the first potential divider is connected to the inverting input of the differential amplifier.

5. Apparatus as claimed in claim 3 wherein the sensing means further comprises:
    a resistor connected between the non-inverting input of the differential amplifier and a point of reference potential; and
    clamping diodes each connected between a respective input of the differential amplifier and a respective supply voltage for the differential amplifier for limiting voltages applied to the respective input.

6. Apparatus as claimed in claim 2 wherein the detecting means comprises:
    rectifying and integrating means for rectifying and integrating the output voltage of the sensing means to produce an integrated voltage dependent upon the common mode current through the feed resistors; and
    comparison means responsive to the integrated voltage exceeding a reference level for opening the switching means.

7. Apparatus as claimed in claim 6 wherein the detecting means includes means responsive to the comparison means for providing a high impedance discharge path for the integrating means when the switching means is open.

8. Apparatus as claimed in claim 7 wherein the comparison means comprises a differential amplifier having an inverting input to which a reference level is supplied, a non-inverting input, and an output, and wherein the means for providing the high impedance discharge path comprises a resistive potential divider connected between a junction point and an output of the rectifying and integrating means at which the integrated voltage is produced, the divider having a tapping point connected to the non-inverting input of the differential amplifier, and two paths each including a respective diode from the junction point to the output of the differential amplifier and to a point of reference potential respectively, the diodes being poled to be reverse biased when the switching means is open.

9. Apparatus as claimed in claim 6 wherein the switching means comprises a relay having a winding coupled between an output of the comparison means and a point of reference potential.

10. Apparatus as claimed in claim 9 wherein the relay winding is coupled between the output of the comparison means and the point of reference potential via a light emitting diode.

11. Apparatus as claimed in claim 6 and comprising zero crossing detection means for providing a reference level for the comparison means in dependence upon zero crossing times of an alternating output voltage of the sensing means, whereby opening of the switching means in response to a common mode alternating current through the feed resistors is effected substantially at a zero crossing time of the alternating current.

12. Apparatus as claimed in claim 11 wherein the zero crossing detection means includes phase shifting means for providing the reference level for the comparison means a predetermined time in advance of a zero crossing of the alternating output voltage of the sensing means, the predetermined time corresponding to a response delay time of the switching means.

13. Apparatus as claimed in claim 11 wherein the zero crossing detection means includes latching means for maintaining the reference level for the comparison means when the switching means is open.

14. Apparatus as claimed in claim 11 wherein the zero crossing detection means comprises:
a differential amplifier having differential inputs, one of which is connected to a zero voltage reference point, and an output;
a phase shifter, comprising a series capacitor and a shunt resistor, connected between the output of the sensing amplifier and the other input of the differential amplifier;
a transistor having a control electrode capacitively coupled to the output of the differential amplifier and a controlled path for supplying the reference level for the comparison means; and
latching means coupled between an output of the comparison means and the control electrode of the transistor for controlling the transistor to maintain the reference level when the switching means is open.

15. Apparatus as claimed in claim 14 wherein the latching means comprises a diode and a resistor connected in series between the output of the comparison means and the control electrode of the transistor.

16. Apparatus as claimed in claim 2 and comprising zero crossing detection means for enabling the detecting means to control the switching means to open the switching means in response to a common mode alternating current through the feed resistors only substantially at a zero corssing time of the alternating current.

17. Apparatus as claimed in claim 16 wherein the zero crossing detection means comprises phase shifting means responsive to an alternating output voltage of the sensing means for enabling the detecting means a predetermined time in advance of a zero crossing of the alternating output voltage of the sensing means, the predetermined time corresponding to a response delay time of the switching means.

18. Apparatus as claimed in claim 1 wherein the switching means comprises an isolation relay for the line.

* * * * *